United States Patent [19]

Hans et al.

[11] Patent Number: 5,796,548

[45] Date of Patent: *Aug. 18, 1998

[54] DISK STORAGE DEVICE HAVING SPINDLE ASSEMBLY WITH RING ENCLOSURE

[75] Inventors: Helmut Hans; Jürgen Oelsch, both of St. Georgen, Germany

[73] Assignee: Papst Licensing GmbH, Germany

[*] Notice: The term of this patent shall not extend beyond the expiration date of Pat. No. 5,594,606.

[21] Appl. No.: 476,085

[22] Filed: Jun. 7, 1995

Related U.S. Application Data

[63] Continuation of Ser. No. 390,936, Feb. 17, 1995, Pat. No. 5,594,606, which is a continuation of Ser. No. 883,029, May 14, 1992, abandoned.

[30] Foreign Application Priority Data

Jun. 29, 1991 [DE] Germany ............ 41 21 425.0

[51] Int. Cl.⁶ ............... G11B 17/02; H02K 5/16
[52] U.S. Cl. ............... 360/99.08; 360/98.07; 369/269; 310/67 R
[58] Field of Search ............ 369/266, 269; 360/99.04, 99.08, 99.09, 99.11, 98.07; 310/46, 66, 67 R, 68 C, 90, 42, 154, 156

[56] References Cited

U.S. PATENT DOCUMENTS

| | | | |
|---|---|---|---|
| 3,822,602 | 7/1974 | Holmes et al. | 74/5 R |
| 4,005,490 | 1/1977 | Duncan et al. | 360/97 |
| 4,717,977 | 1/1988 | Brown | 360/98 |
| 4,739,427 | 4/1988 | Kilmer et al. | 360/97 |
| 4,743,995 | 5/1988 | Castle et al. | 360/98 |
| 4,754,351 | 6/1988 | Wright | 360/97 |
| 4,754,353 | 6/1988 | Levy | 360/106 |
| 4,760,298 | 7/1988 | Kitahara | 310/67 R |
| 4,763,053 | 8/1988 | Rabe | 318/254 |
| 4,796,122 | 1/1989 | Levy et al. | 360/98.01 |
| 4,797,762 | 1/1989 | Levy et al. | 360/99.06 |
| 4,805,055 | 2/1989 | Wright | 360/106 |
| 4,814,652 | 3/1989 | Wright | 360/98.07 |
| 4,853,567 | 8/1989 | Muramatsu et al. | 310/67 R |
| 4,853,839 | 8/1989 | Forbes et al. | 29/596 |
| 4,928,029 | 5/1990 | Wright | 310/89 |
| 4,998,033 | 3/1991 | Hisabe et al. | 310/67 R |
| 5,001,581 | 3/1991 | Elsässer et al. | 360/97.02 |
| 5,006,943 | 4/1991 | Elsässer et al. | 350/99.08 |
| 5,040,085 | 8/1991 | Elsässer et al. | 360/98.07 |
| 5,045,738 | 9/1991 | Hishida et al. | 310/90 |

(List continued on next page.)

FOREIGN PATENT DOCUMENTS

| | | |
|---|---|---|
| 0 402 240 A1 | 12/1990 | European Pat. Off. . |
| 965860 | 9/1950 | France . |
| 136 683 | 7/1979 | Germany . |
| 3 135 385 A1 | 3/1983 | Germany . |
| 3 538 480 A1 | 6/1986 | Germany . |
| 3 542 542 A1 | 6/1987 | Germany . |
| 3 818 994 A1 | 12/1988 | Germany . |
| 57 105 863 A | 7/1982 | Japan . |
| 60-256 983 A | 12/1985 | Japan . |
| 61 242 378 | 10/1986 | Japan . |
| 3-198-640 A | 8/1991 | Japan . |
| 216465 | 5/1924 | United Kingdom . |
| 417794 | 9/1934 | United Kingdom . |
| 996919 | 6/1965 | United Kingdom . |
| 2 166 586 | 5/1980 | United Kingdom . |
| 2 202 386 | 9/1988 | United Kingdom . |
| W88/06781 | 9/1988 | WIPO . |

*Primary Examiner*—Stuart S. Levy
*Assistant Examiner*—Kevin M. Watkins
*Attorney, Agent, or Firm*—Fitch, Even, Tabin & Flannery

[57] ABSTRACT

A disk storage drive is provided with a brushless drive motor having a stator with a winding. An external rotor housing including a permanent magnet coaxially surrounds the stator and is spaced therefrom by a substantially cylindrical air gap. A hub is provided that is concentric to the rotor housing and is connected to the rotor housing for rotation therewith. A bearing above the stator rotatably supports an upper end of the rotor housing on a stationary shaft and a bearing below the stator braces the open end of the rotor housing by a ring element having substantially the same heat expansion characteristics as the rotor housing.

18 Claims, 1 Drawing Sheet

U.S. PATENT DOCUMENTS

| | | | |
|---|---|---|---|
| 5,047,677 | 9/1991 | Mineta et al. | 310/67 R |
| 5,091,809 | 2/1992 | Conners et al. | 360/99.08 |
| 5,138,209 | 8/1992 | Chuta et al. | 310/67 R |
| 5,160,865 | 11/1992 | Gururangaw | 310/67 R |
| 5,173,814 | 12/1992 | Elasser et al. | 360/98.07 |
| 5,216,557 | 6/1993 | Elsaess et al. | 360/99.08 |
| 5,227,686 | 7/1993 | Ogawa | 310/90 |
| 5,243,242 | 9/1993 | Cap et al. | 310/67 R |
| 5,251,081 | 10/1993 | Cossette et al. | 360/97.02 |
| 5,256,926 | 10/1993 | Hagenlocher et al. | 310/259 |
| 5,446,610 | 8/1995 | Elsaesser et al. | 360/99.08 |
| 5,594,606 | 1/1997 | Hans et al. | 360/99.08 |

DISK STORAGE DEVICE HAVING SPINDLE ASSEMBLY WITH RING ENCLOSURE

This is a continuation of application Ser. No. 08/390,936, filed Feb. 17, 1995 (now U.S. Pat. No. 5,594,666), which is a continuation of application Ser. No. 07/883,029, filed May 14, 1992 (now abandoned).

BACKGROUND OF THE INVENTION

The invention pertains to a disk storage drive with a brushless dc driving motor that comprises a stator provided with a winding and an outer rotor with a permanent magnetic rotor magnet that encompasses the stator and forms an essentially cylindrical air gap, as well as a hub that is connected with the rotor magnet in a nonrotating manner and is provided with a disk carrier section that can be stuck through a central opening of the storage disk in order to serve as a receptacle for at least one storage disk arranged in a clean room, whereby at least half of the axial longitudinal extent of the stator winding and the motor magnet interacting with the same are held within the space enclosed by the plate carrier section of the hub, and whereby the rotor and the hub are supported in a rotatable manner on a stationary shaft by a bearing arrangement with a first bearing.

Such a drive is known from DE-OS 3,818,994.

Certain problems exist with such devices or drives for such devices, namely that the extreme precision requirements in regard to the quality constant must be fulfilled even at changing temperatures which represents a particularly frequent problem with hard disk storage drives.

SUMMARY OF THE INVENTION

This invention is based on the objective of maintaining a high precision even at changing temperatures, and of better ensuring the long-term constancy of the precision.

This objective is attained by the elements described in claim 1, or claim 11 respectively.

BRIEF DESCRIPTION OF THE DRAWINGS

In regard to the bearings, the stator laminated core and the rotor magnet, FIG. 1 illustrates one application example of the invention with a motor structure that is arranged nearly symmetrical to the axial center plane of the stator laminated core.

DESCRIPTION

Figure 1:
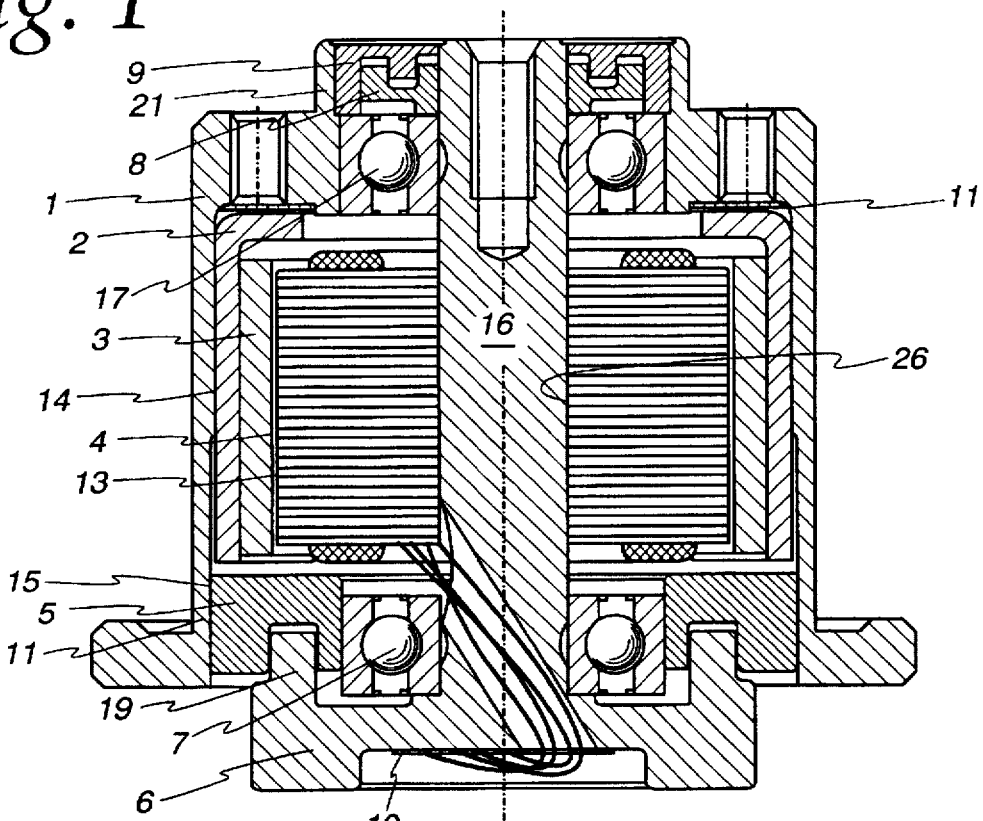
FIGS. 1 and 2 show examples of the invention in the form of sectional representations that are described in detail in the following.

The disk storage drive is provided with a hub (1) which has a hat-shaped cross sectional profile and is manufactured from aluminum or another light metal. The hub (1) is attached onto a keeper ring (2) whose upper end is bent at a right angle. The hub (1) and the keeper ring (2) are connected by partial bonding approximately in the axial center, for example in the area of the location (14). A rotor magnet (3) which is preferably constructed in form of a permanent magnetic ring is inserted into the pot-shaped keeper iron (2) which is constructed like a deep-drawn part, whereby the rotor magnet is separated from the inner stator by a cylindrical air gap (13), and the inner stator consists of a laminated core (4) and a winding that essentially lies in axially extending grooves of the laminated core. The stator laminated core (4) is rigidly connected to a central vertical shaft (16) by a joining gap (26), whereby an upper bearing (17) and a lower bearing (7) are pressed onto this shaft with their inner running surfaces. The central shaft (16) expands on its lower end in radial direction to form a flange (6) that serves as a retainer for the motor and simultaneously forms a labyrinth seal together with projections (19) that protrude axially into a rotating ring element (5). A labyrinth seal is formed in a similar manner on the upper end by corresponding axial projections on a sealing washer (9) that protrude towards the inside, whereby these projections engage into a correspondingly profiled stationary ring element (8) arranged above the upper bearing (17), so that the upper and lower bearings are axially sealed on the outside. The outer axial labyrinth-like sealing washer (9) rotates on the upper bearing (17), while the outer axial flanged disk (6) with its axially inward protruding projections (19) is stationary on the lower end.

The central shaft (16) whose lower diameter is strongly enlarged and thus forms the flange (6) is manufactured from a light metal such as an aluminum alloy. It carries the inner bearing race of the bearings (17 and 7) on the upper and lower ends, while the outer bearing race of the lower bearing (7) engages into the high-precision ring element (5) and is connected with the same in a nonrotating manner. The ring element (5) consists of the same material as the shaft (16) or a different material with the same heat expansion.

The ring element (5) has very exactly dimensioned cylindrical inner and outer surfaces, whereby the outer surface (15) serves as a receptacle for the hat-shaped hub part (1) with the cylindrical inner wall at the lower open end. The hub part (1) consists of a material with equal or similar heat expansion as the heat expansion of the ring element (5). The hub (1) has an opening with a very exact cylindrical inner surface on its upper base that is connected with the outer race of the upper bearing (17) in a nonrotating manner. An axially protruding collar (21) connected to the same carries the rotating sealing washer (9).

For reasons of economy and manufacturing technology, the hub (1) is advantageously manufactured from a light metal alloy. It is very important that a closed metal circuit, so to speak, which has a similar heat expansion behavior be arranged around the upper and lower bearings similar to a closed magnetic circuit. This means that the precision can be maintained relatively well even at changing temperatures.

Figure 2:
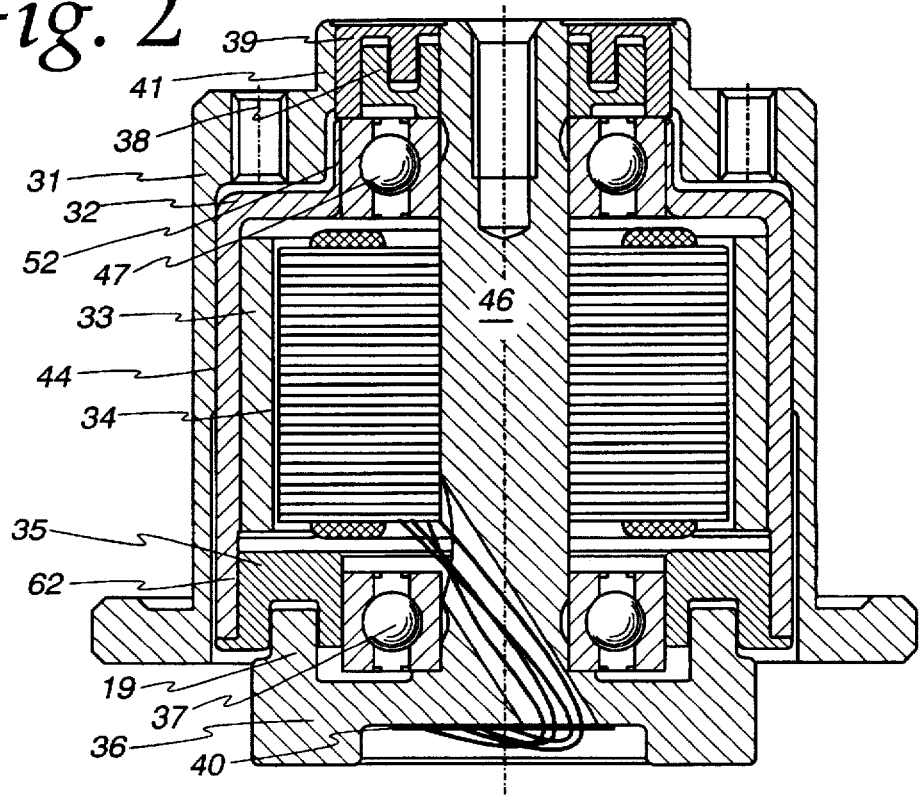

The same is also valid for the example according to FIG. 2 which differs from the example according to FIG. 1 by the fact that a virtual "steel heat-expansion circuit" is provided. A central vertical shaft (46) expands radially on its lower end to form a flange (36) and is manufactured from steel, for example as an automatically turned part, and the cylinder surface of the central shaft (46) carries a bearing (47) on the top and a bearing (37) on the bottom. The outer race of the upper bearing (47) is connected concentrically, at high precision, and in a nonrotating manner with a low-retentivity keeper part (32) by the fact that this keeper part (32) is provided with an axially protruding collar (52) on the upper end that serves as receptacle for the outer race of the bearing (47). A ferromagnetic iron or steel part (35) constructed in accordance with the ring element (5) consisting of aluminum in FIG. 1 is attached to the outer race of the lower bearing (37) in the area of the lower edge (62) of the milk can-shaped deep-drawn part (32), whereby the inner race of the lower bearing (37) is arranged on the outer surface of the centrally arranged stationary and ferromagnetic shaft (46) which is exactly machined in the area of the bearings.

Structural elements (31,33,34,38,39,41 and 44) in FIG. 2 correspond with the structural elements (1,3,4,8,9,14 or 21)

in FIG. 1 and thus do not require further explanation. FIG. 2 thus represents a more complete heat expansion circuit than FIG. 1 since the bearings (7 and 17) consisting of steel are in FIG. 1 arranged within the virtual "aluminum circuit" consisting of the parts (1,5,16).

The so-called aluminum circuit that encompasses the bearings in FIG. 1 is altogether somewhat more economical in regard to its manufacture than the even more precise so-called steel circuit in FIG. 2 which, however, is probably somewhat more demanding as far as manufacturing technology is concerned.

We claim:

1. A disk storage device, comprising:
   a clean room chamber;
   at least one storage disk located in said clean room chamber;
   at least one transducer head mounted in said clean room chamber for sensing data recorded on said storage disk;
   a stator provided with a winding;
   a rotor with a permanent magnetic rotor magnet that forms an essentially cylindrical air gap with said stator, said rotor being in said clean chamber and including a hub that is provided with a disk carrier section that is inserted through a central opening of the storage disk in order to serve as a receptacle for the at least one storage disk arranged in the clean room chamber, whereby at least half of the axial longitudinal extent of the stator winding and the rotor magnet interacting with the stator winding are held within the space enclosed by the disk carrier section of the hub portion, a stationary shaft and a bearing arrangement, including first and second bearings supporting said rotor for rotation;
   a first seal sealing the first bearing;
   a second seal sealing the second bearing;
   wherein the rotor includes a keeper part, between the rotor magnet and the hub portion, constructed at one axial end to engage the outer race of the second bearing; and
   a ring element fitted in a highly precise and concentric manner between the inner periphery of a rotor part and the outer race of said first bearing, the ring element, the keeper part and the bearings essentially enclosing the stator and the winding and being made of a common material different from the material of the hub.

2. A disk storage device according to claim 1 wherein the keeper part is constructed of a low-retentivity material.

3. A disk storage device according to claim 2, wherein the low-retentivity keeper part carries an attached nonferromagnetic hub portion.

4. A disk storage device according to claim 1, wherein at least two-thirds of the axial longitudinal extent of the stator winding and the rotor magnet interacting with the same are located within the space enclosed by the disk carrier section of the hub portion of the rotor.

5. A disk storage device according to claim 1, wherein the ring element is fitted into the open end of the rotor part.

6. A disk storage device according to claim 1, wherein the stationary shaft includes a flange portion that is suitable for attachment to a wall of said clean chamber of the device.

7. A disk storage device according to claim 6, wherein the ring element is at least approximately aligned in axial direction with the flange.

8. A disk storage device according to claim 6, wherein the flange is provided with axially directed projections that engage into an annular groove in the ring element to form a narrow gap which acts as a labyrinth seal.

9. A disk storage device according to claim 8, wherein the annular groove has a rectangular shape viewed in a longitudinal section through the axis.

10. A disk storage device according to claim 1, wherein the first seal and the second seal comprise labyrinth seals that are provided axially above the second bearing and axially below the first bearing.

11. A disk storage device, comprising:
    a clean room chamber;
    at least one storage disk located in said clean room chamber;
    at least one transducer head mounted in said clean room chamber for sensing data recorded on said storage disk;
    a stator provided with a winding;
    a rotor with an outer rotor housing that encompasses the stator and thus forms an essentially cylindrical air gap therewith, said rotor having a permanent magnetic rotor magnet as well as a hub portion that is provided with a disk carrier section that is inserted through a central opening of the storage disk in order to serve as a receptacle for the at least one storage disk arranged in the clean room chamber, at least half of the axial longitudinal extent of the stator winding and the rotor magnet interacting with the stator winding being located within the space enclosed by the disk carrier section of the hub portion;
    a stationary shaft and a bearing arrangement rotatably supporting said rotor and hub portion, said stator having a laminated core that is rigidly arranged on said stationary shaft, and whereby the bearing arrangement includes a pair of axially spaced bearings each of which is provided with an inner and an outer race fixed on the shaft, said bearings positioned axially on opposite sides of the stator with a first bearing arranged in the area of the open end of the outer rotor housing and a second bearing being arranged in a closed wall of the outer rotor housing;
    wherein the rotor includes a keeper part, between the rotor magnet and the hub portion, constructed at one axial end to engage the outer race of the second bearing; and
    a ring element positioned between the outer race of the first bearing and the inner periphery of the rotor, said ring element being made of a material with essentially the same heat expansion characteristic as the keeper part, the ring element, the keeper part and the bearings essentially enclosing the stator and the winding.

12. A disk storage device according to claim 11, wherein the stationary shaft consists of a material that has essentially the same heat expansion characteristic as the material of the rotor part and the material of the ring element.

13. A disk storage device according to claim 11, wherein the stator winding and the rotor magnet interacting with the stator winding have at least two thirds of their axial longitudinal extent located within the space enclosed by the disk carrier section of the hub portion.

14. A disk storage device according to claim 11 wherein the keeper part is constructed of a low-retentivity material.

15. A disk storage device according to claim 14, wherein the low-retentivity keeper part carries an attached non-ferromagnetic hub portion.

16. A disk storage device according to claim 11, wherein the stationary shaft is affixed to a flange that is suitable for attachment to a wall of the clean room chamber.

17. A disk storage device according to claim 16, wherein the ring element is at least approximately aligned in axial direction with the flange.

18. A disk storage device according to claim 11, wherein labyrinth seals are provided axially above the first bearing and axially below the second bearing.

* * * * *